United States Patent
Ihde

(10) Patent No.: US 7,502,284 B2
(45) Date of Patent: *Mar. 10, 2009

(54) METHODS FOR OPTICAL DISC SECTOR VERIFICATION

(75) Inventor: Wayne Ihde, Boulder, CO (US)

(73) Assignee: Sonic Solutions, Inc., Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/601,387

(22) Filed: Nov. 17, 2006

(65) Prior Publication Data

US 2007/0064548 A1    Mar. 22, 2007

Related U.S. Application Data

(63) Continuation of application No. 11/202,990, filed on Aug. 11, 2005, now Pat. No. 7,145,840, which is a continuation of application No. 09/614,065, filed on Jul. 11, 2000, now Pat. No. 6,973,014.

(51) Int. Cl.
    *G11B 7/004* (2006.01)
(52) U.S. Cl. .................................. 369/30.21; 369/53.17
(58) Field of Classification Search ........................ None
    See application file for complete search history.

(56) References Cited

U.S. PATENT DOCUMENTS 5,132,956  A  *  7/1992   Ichikawa .................. 369/53.17
5,469,546  A  *  11/1995  Hosoya .......................... 714/8
5,966,358  A  *  10/1999  Mine ........................ 369/47.14
6,160,778  A  *  12/2000  Ito et al. ................... 369/53.15
6,301,211  B1 *  10/2001  Ichikawa et al. .......... 369/47.27
6,330,210  B1 *  12/2001  Weirauch et al. ......... 369/30.11
6,973,014  B1 *  12/2005  Ihde ........................ 369/30.21
7,145,840  B2 *  12/2006  Ihde ........................ 369/30.21

* cited by examiner

*Primary Examiner*—Michael V Battaglia
(74) *Attorney, Agent, or Firm*—Martine Penilla & Gencarella LLP

(57) ABSTRACT

A method for verifying sectors on an optical disc is provided. The method includes writing user data to unverified sectors of the optical disc and verifying the sectors of the optical disc with the user data. The sectors of the optical disc are verified by reading the user data on the unverified sectors of the optical disc and comparing the user data read from the unverified sectors of the optical disc with user data stored on a system buffer. The sectors of the optical disc are verified to determine whether any one of the unverified sectors having user data is defective. Also, the verifying of the unverified sectors establishes verified sectors having user data. The sectors of the optical disc that have been verified are tracked with a bitmap that is continually updated as the sectors are verified.

18 Claims, 8 Drawing Sheets

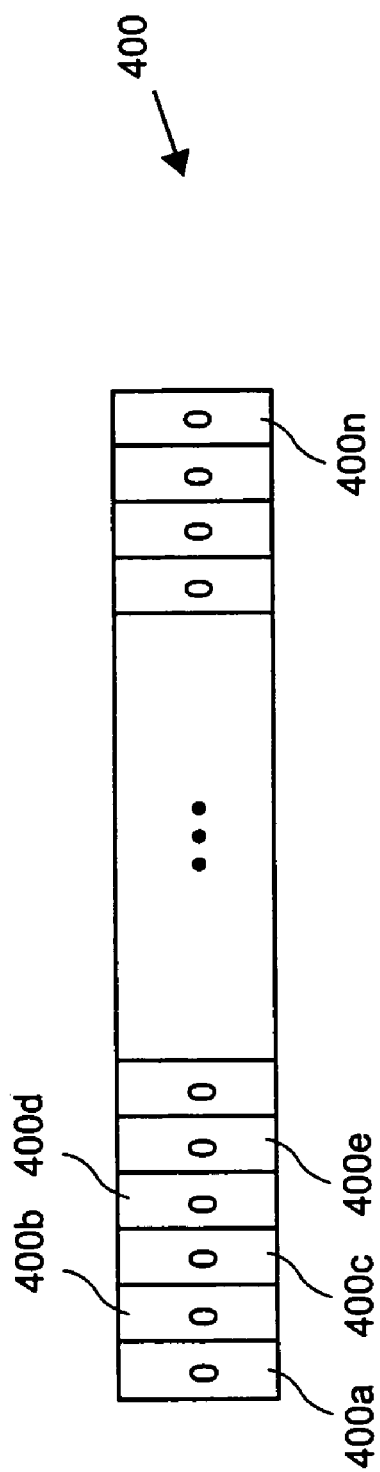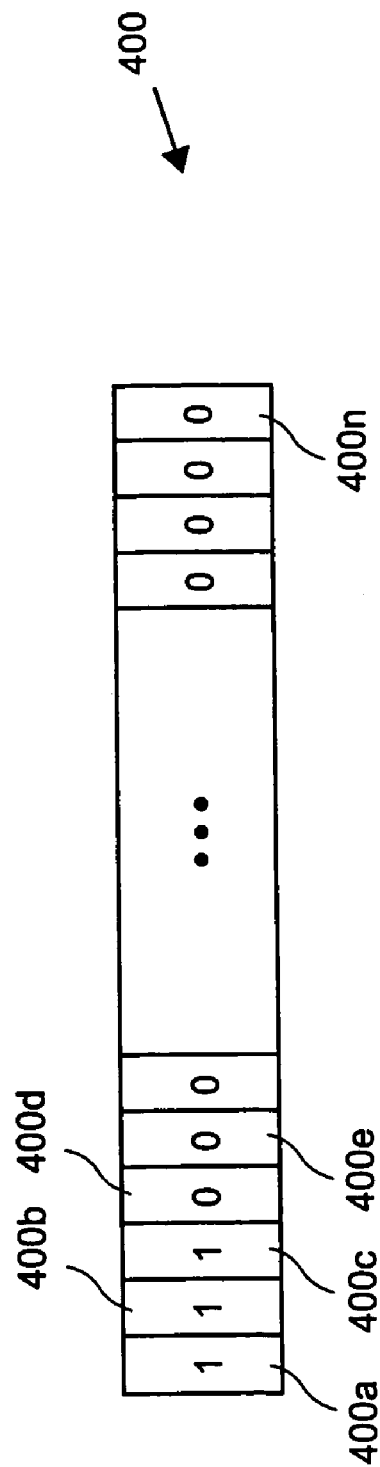

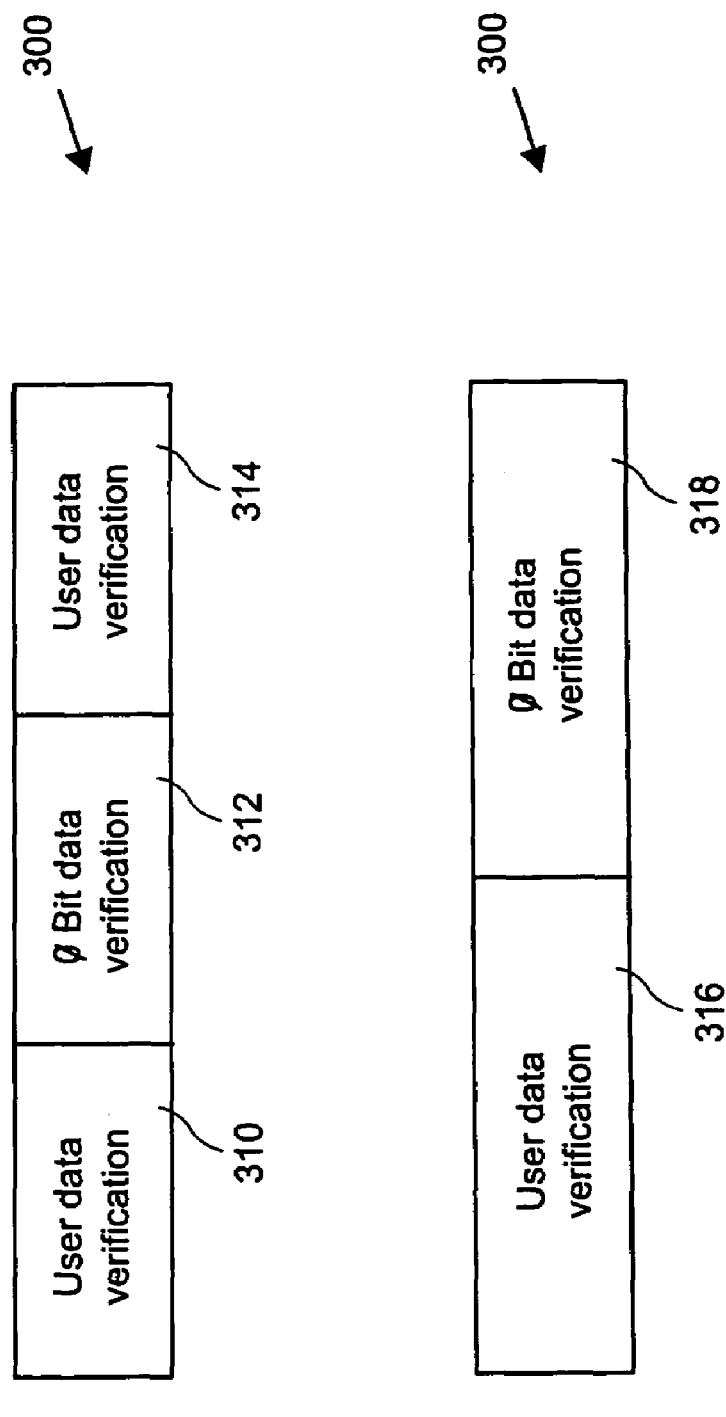

METHODS FOR OPTICAL DISC SECTOR VERIFICATION

CLAIM OF PRIORITY

The present application claims priority as a continuation to U.S. patent application Ser. No. 11/202,990 entitled, "Methods for Optical Disc Sector Verification," filed on Aug. 11, 2005 now U.S. Pat. No. 7,145,840 and incorporated herein by reference, which claims priority as a continuation to Ser. No. 09/614,065 now U.S. Pat. No. 6,973,014 entitled, "Methods for Optical Disc Sector Verification," filed on Jul. 11, 2000 and incorporated herein by reference.

BACKGROUND OF THE INVENTION

1. Field of the Invention

This invention relates generally to verifying rewritable optical disc media, and more particularly to verifying sectors of optical discs to check for defective sectors prior to storing data on the sectors of optical discs.

2. Description of the Related Art

Consumers are increasingly demanding storage media which have greater storage capabilities. In response to these demands, retailers have started manufacturing optical discs such as rewritable compact discs (CD-RW) that have increased storage capacity in comparison to other storage media. Optical discs store information on tracks that spiral around the center of the disk. The spiral contains sectors to which data is written and stored. When optical discs are purchased by consumers, certain defects may exist on the optical disc itself. These defects may be the culprit of mishandling during the manufacturing phase of the optical disc, drive to media compatibility, imperfection in the material of the optical disc itself or any other manufacturing error. The defects affect the storage capabilities of the optical disc in that certain sectors on the optical disc are not capable of storing information.

For packet writing, data is commonly written to a disc onto one track. Groups of sectors are then written to the track. However, before the groups of sectors are written to the track, measures must be taken to verify the optical disc in order to determine what sectors are defective to prevent writing to those sectors and potentially losing the data written to those defective sectors.

In order to determine which sectors on a optical disc are defective, the optical disc is subjected to a verification process. Current types of verification processes write data to the optical disc and then reads are performed to the written sectors to determine if particular sectors on the optical disc are defective. In one example verification process, 0's are written to the sectors and then reads are performed to determine if 0's are read back. If 0's aren't read back from a sector, the sector will be flagged and the file system of the optical disc will be updated to reflect that data should not be written to that particular sector. While this method ensures that data will not be written to defective sectors, the process is very time consuming. Using a 2× writing operation and a 6× reading operation, the verification operation can take anywhere from 50 to 90 minutes to complete. This amount of time makes optical discs and more particularly CR-RWs an unattractive option to those desiring to quickly store data to new discs. Due to the amount of time required to do verification, some software packages provide the option to skip verification altogether.

Another method used for verifying sectors on optical discs involves only verifying a small group of sectors and then writing user data to the verified sectors. This is an alternative to verifying the entire disc before allowing user data to be written (i.e., as described above). While a next set of sectors are verified, user data is allowed to be written to the verified group of sectors. Of course, user data cannot be written to the entire optical disc, just areas that have been verified. Under this scheme, additional sectors are written to keep track of what sectors have been verified. Nonetheless, this process is also time consuming because a user must wait for the verification before user data may be written to the disc. Also, extra storage capacity is occupied by the sectors that keep track of which sectors have been verified. This, as can be appreciated, uses up space that would otherwise be available for user data.

In view of the foregoing, there is a need for a method to verify optical discs that is less time consuming than prior art methods. This verification method should also allow user data to be written immediately to an optical disc as the optical disc is being verified.

SUMMARY OF THE INVENTION

Broadly speaking, the present invention fills these needs by providing a method for verifying optical disc media with user created data. It should be appreciated that the present invention can be implemented in numerous ways, including as a process, an apparatus, a system, a device, or a method. Several inventive embodiments of the present invention are described below.

In one embodiment, a method for verifying sectors on an optical disc is disclosed. The method includes writing user data to unverified sectors of the optical disc and verifying the unverified sectors of the optical disc. The unverified sectors are verified by reading the user data on the unverified sectors of the optical disc and comparing the user data read from the unverified sectors of the optical disc with user data stored on a system buffer. The user data read from the unverified sectors is compared with the user data on the system buffer to determine whether any one of the unverified sectors having the user data is defective. The verifying of the unverified sectors establishes verified sectors having user data.

In another embodiment, a method for verifying media of an optical disc is disclosed. The method includes writing user data from a source to sectors of the optical disc and verifying the sectors containing the user data. The sectors containing the user data are verified by comparing the user data written to the optical disc to user data resident on the source. The sectors are verified to determine whether any of the sectors is defective.

In still a further embodiment, a method for optical disc verification is disclosed. The method includes writing user data located on a system buffer to sectors of the optical disc. The sectors are then verified by reading the user data from the sectors on the optical disc and comparing the user data read from the sectors of the optical disc with the user data stored on the system buffer. The verification is performed to determine if any of the sectors of the optical disc are defective.

The many advantages of the present invention should be recognized. The present invention determines which sectors of an optical disc are defective by writing user data to the sectors. This greatly reduces the time to verify an optical disc and initially store data on a optical disc. This ensures that less data stored to an optical disc is lost since users are more likely to verify sectors prior to using the optical disc and less software is likely to skip the verification process due to the shorter verification times.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 3A shows a bitmap in accordance with one embodiment of the present invention.

FIG. 3B shows a bitmap after sectors of an optical disc have been verified in accordance with one embodiment of the present invention.

FIG. 4A is an embodiment of the present invention illustrating a verified optical disc.

FIG. 4B illustrates a verified optical disc in accordance with one embodiment of the present invention.

DETAILED DESCRIPTION OF THE PREFERRED EMBODIMENTS

An invention for a method of verifying sectors of optical discs with user data is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention relates generally to verifying sectors of an optical disc, such as a CD-RW as information is being written to sectors of the disc. When a new optical disc is inserted into a drive for the first time, sectors are established in a spiral orientation around the optical disc which store data. An area for a file system is verified on sectors established on the optical disc and then the file system is written to the area. The file system contains data structures that are used to keep track of and address the sectors of the optical disc. That is, some of the data structures provide information as to the location of files written on the sectors of the optical disc.

After the file system is established, the remaining sectors of the optical disc must be verified to determine which sectors, if any, are defective. If a sector is determined to be defective, the data written to that sector will be moved. However, if a sector is determined not to be defective, data written to that sector of the optical disc will remain written in that particular sector. Thus, the verification of the sectors is done using the data itself.

Figure 1A:
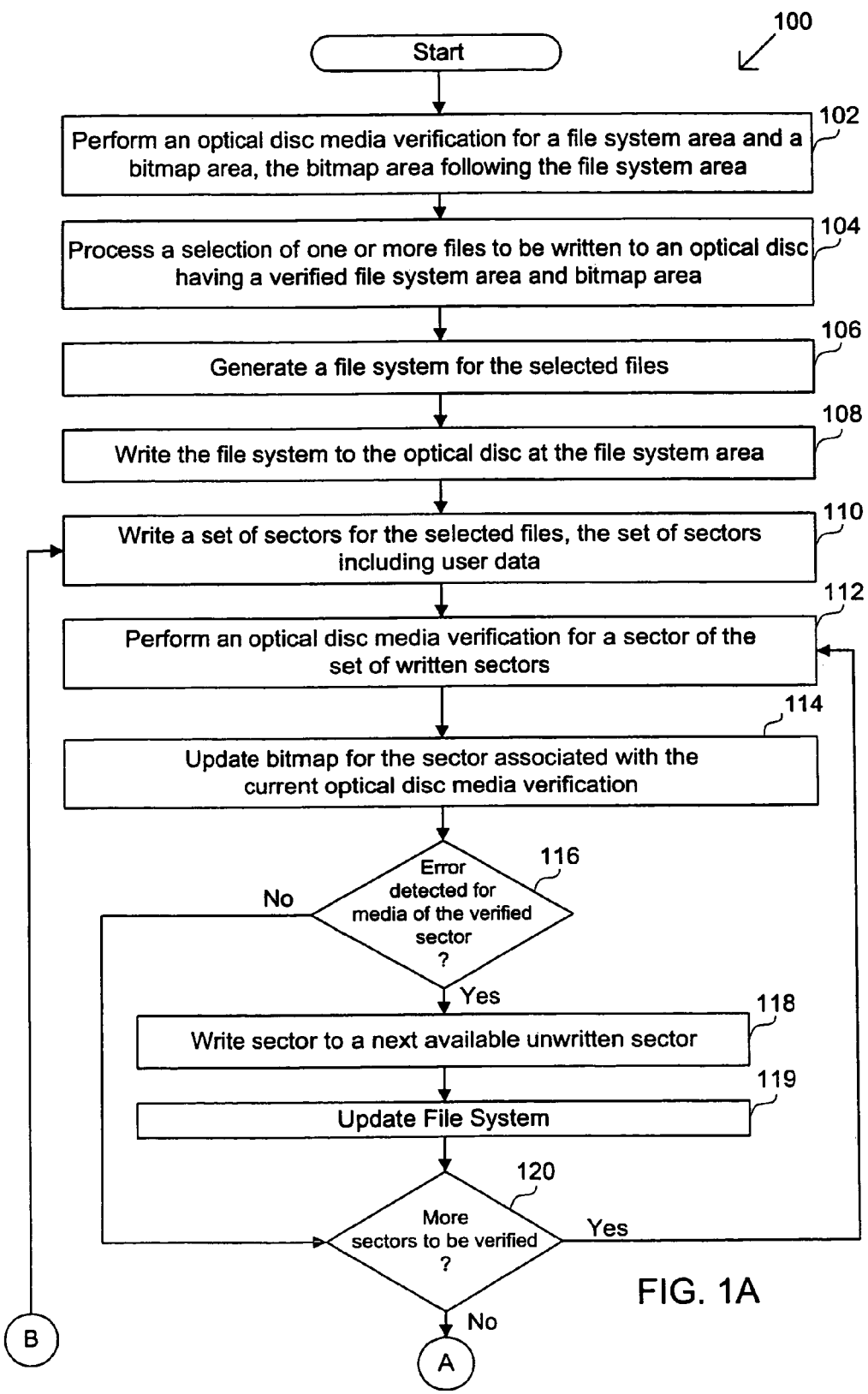
FIG. 1A is a flowchart showing a method for verifying sectors on an optical disc in accordance with one embodiment of the present invention.

Now making reference to FIG. 1A, FIG. 1A is a flowchart showing a method 100 for verifying sectors on an optical disc. In operation 102, after an optical disc is inserted into a drive (not shown), an initial verification is performed for a file system (FS) area 302 (see FIG. 2A) and a bitmap area (BMA) 304 (see FIG. 2A). In one embodiment of the present invention, the file system area 302 and the bitmap area 304 are written at the beginning of the optical disc 300. The file system area 302 is an area that contains a data structure for the sectors to be written to the optical disc. As will be described below, as a verification is performed, the file system will be updated to define which sectors are bad and which sectors actually contain user data.

In one embodiment, the file system area 302 is verified by writing 0's to the sectors of the optical disc 300 that will eventually contain the file system area 302. The 0's written to the sectors are then read back from the sectors. If the data read back are 0's, this indicates that the sectors are suitable to store the file system.

After the file system area 302 is verified, a verification is performed for the bitmap area 304. The bitmap area 304 contains bitmap 400 (see FIG. 3A), the bitmap 400 is used to keep track of what sectors of the optical disc 300 have been verified. The bitmap 400 is a group of bits that occupy a particular sector on the optical disc 300. In one embodiment, the bitmap 400 may be raw sectors on the optical disc 300 which require writing a pointer to the sectors occupied by the bitmap area 304. After the optical disc 300 is verified, the bitmap 400 is deleted. In a preferred embodiment, the bitmap 400 may be a bitmap written as a file which is managed by the file system. As those skilled in the art will appreciate, the bitmap file does not require that a separate pointer be written to the optical disc 300. The file containing the bitmap 400 is hidden from user access and deleted when the verification of the optical disc 300 is complete. In both embodiments, after the bitmap 400 is deleted, the additional space created by the deletion of the bitmap 400 on the optical disc 300 is available for data storage. Furthermore, the presence or absence of the bitmap file indicates the verification state of the disc. The bitmap area 304 is verified in the same manner as the file system area 302 using the same procedure previously described. After the file system area 302 and the bitmap area 304 are verified, the method moves to operation 104.

Referring back to FIG. 1A, the method 100 processes a selection of one or more files which are to be written to the optical disc 300 after the file system area 302 and the bitmap area 304 have been verified in operation 104. The files contain user data which will be stored on the optical disc 300 once the optical disc 300 is verified. The method 100 reads the user data from another source, such as a host's storage medium or a peripheral device connected to the host which contains the user data, and transfers the user data to a system buffer in the system memory of the host. Once the method 100 has moved the files to the system buffer, the method proceeds to operation 106.

In operation 106, the file system for the selected files is generated. The file system contains the data structures which specify the location of a file on a particular sector on the optical disc 300. It should be noted that the file system is rewritable, thus the file system may be updated as the user data residing on the system buffer is written to the optical disc 300, as will be discussed further with respect to operation 119. After the file system is generated in operation 106, the file system is written to the optical disc at the file system area 302 in operation 108.

Once the file system is written in operation 108, data from the selected files stored on the system buffer is written to sectors on the optical disc 300 in operation 110. In one embodiment, data from the system buffer is written in sector sets that contain 32 sectors of information. Thus, no verification of the sectors is performed until 32 sectors of user data have been written.

An optical disc media verification is performed in operation 112. The optical disc media verification operation verifies that the sectors to which the user data in operation 110 was written are acceptable for storing data (i.e., defect free). The verification first reads the user data written to the sectors of the optical disc 300 in operation 110. The user data read from the sectors is then compared with the user data stored on the system buffer of the host. If the user data read from the sector of the optical disc matches the user data stored on the system buffer, then that sector to which the data is written is acceptable for storing data. If the user data read from the sector does not match the data stored in the system buffer, then that sector is unacceptable for data storage. It should be noted that as the user data written to sectors of the optical disc 300 is verified in operation 112, no other data is being written to the optical disc 300 from the system buffer of the host. After the optical disc media verification is complete in operation 112, the bitmap is updated to reflect which sectors on the optical disc 300 have been verified in operation 114. This operation will be more fully discussed with reference to FIGS. 4A and 4B.

After the bitmap is updated in operation 114, a determination is made in operation 116 if an error was detected for the sectors verified in operation 112. As previously discussed with respect to operation 112, during the verification operation, the data read back from the sector is compared to the data stored on the system buffer. An error is detected in operation 116 if the data read back form the sector does not match the data stored on the system buffer of the host. If an error is not detected in operation 116, the method 100 moves to operation 120, as will be further discussed below. If an error is detected in operation 116, the method proceeds to operation 118.

In operation 118, the data written to the sector in which an error was detected is written to another sector of the optical disc 300 during a sparing operation. In this embodiment, the sparing operation rewrites the data written on the bad sector to the next available sector of the optical disc 300, as will be further discussed with reference to FIGS. 2B-2F. In accordance with one embodiment of the present invention, the sparing operation may rewrite an individual sector which was determined to contain an error in operation 116 to the next available sector, as will be more fully discussed with reference to FIGS. 2B-2D. Alternatively, in another embodiment, the sparing operation shifts the entire sector set over one sector such that each individual sector within the sector set occurring after the bad sector is rewritten to the next sector, as will be fully discussed with reference to FIGS. 2E and 2F. In a further embodiment of the present invention, the sparing operation writes the data written in the bad sector to a block of sectors on the optical disc 300 (not shown) specifically reserved for data writing during sparing operations.

After the user data is written to a next available sector in operation 118, the method 100 moves to operation 119. In operation 119, the file system is updated to reflect the new sector location to which the data was written. If the data contained in the bad sector was written to the next available sector located on the disc 300 after the sector set being verified, then the file system is updated to reflect the change in location for the individual sector. If the entire sector set was shifted, then the file system is updated to reflect the new location of the shifted individual sectors within the sector set on the optical disc 300.

Once the file system is updated in operation 119, the method 100 performs operation 120. In operation 120, it is determined if more sectors on the optical disc 300 must be verified. If more sectors are to be verified (e.g., sectors 2-32), the method 100 moves back to operation 112 and repeats operations 112-116, and if necessary, operations 118 and 119. If no other sectors are to be verified (e.g., all 32 sectors are verified), the method 100 moves to operation 122 in FIG. 1B.

Figure 1B:
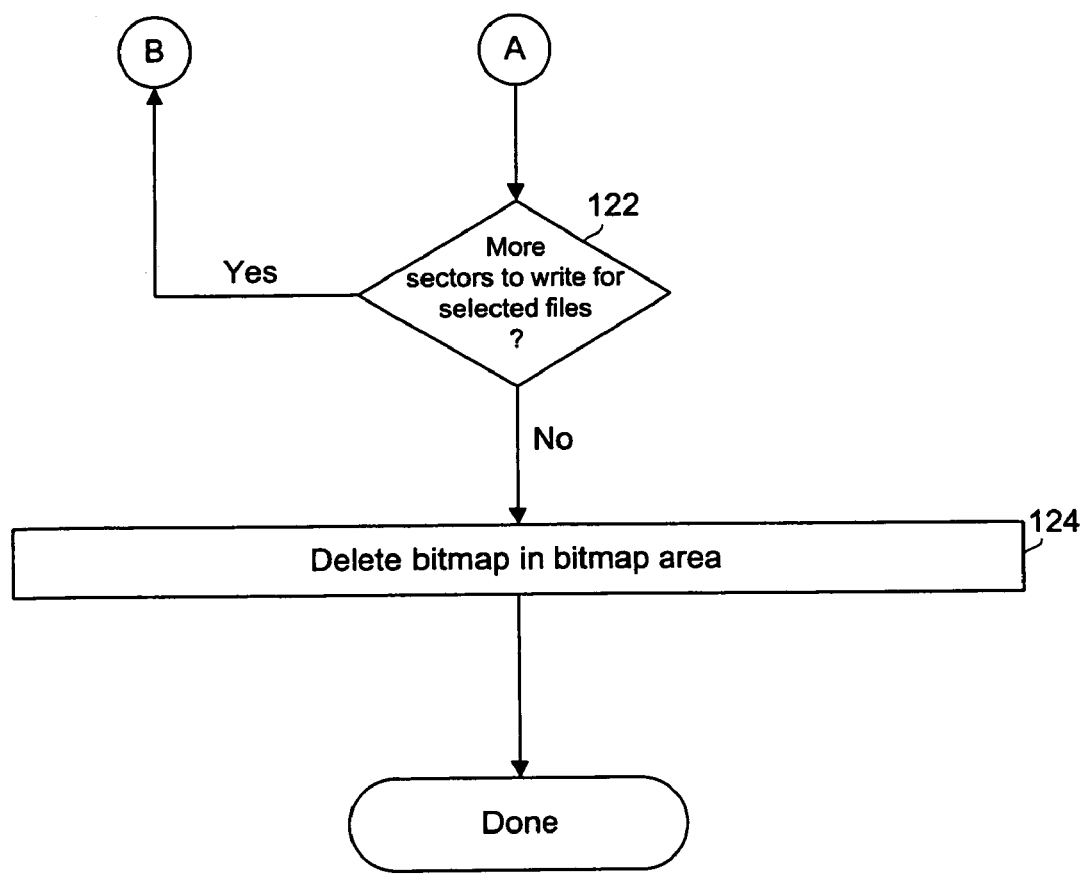
FIG. 1B is an embodiment of the present invention illustrating a method for verifying sectors of an optical disc.

FIG. 1B is an embodiment of the present invention illustrating the method 100 verifying sectors of an optical disc 300. In operation 122, the method determines if more sectors are to be written for selected files. If more user data is to be stored on the optical disc 300, the method 100 reverts back to the operation 110 and repeat operations 110 to 122 until all the user data stored on the system buffer is written to the optical disc 300.

After the method 100 writes all the information on the system buffer to the optical disc 300, the method 100 performs operation 124. In operation 124, the bitmap which tracks which sectors have been verified is deleted from the bitmap area 304. As previously mentioned, the sectors occupied by the bitmap and the bitmap area 304 are available to store additional data. Thus, the bitmap does not occupy additional space on the optical disc 300. Once the bitmap is deleted from the bitmap area 304 in the operation 124, the method 100 is complete and the optical disc 300 is verified.

Figure 2A:
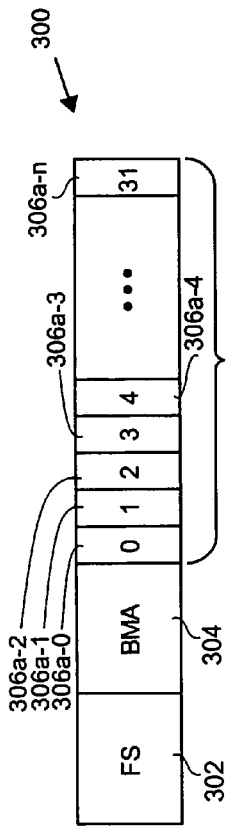
FIG. 2A shows an optical disc with a sector set containing data written to the optical disc in accordance with one embodiment of the present invention.
Figure 2B:
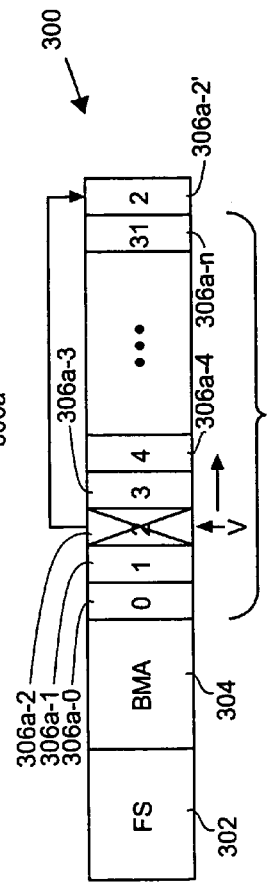
FIG. 2B is an embodiment of the present invention illustrating an optical disc with user data written to the optical disc in a sector set after a verification operation has been performed on the optical disc.

FIG. 2A shows a portion of the optical disc 300 with a sector set 306a containing data written to the optical disc 300, in accordance with one embodiment of the present invention. Also shown is the file system area 302 and the bitmap area 304. As previously described, the sectors occupied by the file system area 302 and the bitmap area 304 are verified and written to prior to writing the sector set 306a and other user data to the optical disc 300. As user data is written to the optical disc 300, the user data is written in sector sets such as sector set 306a. The sector set 306a includes 32 sectors 306a-0 through 306a-n. FIG. 2B shows the optical disc 300 with user data written to the optical disc 300 in sector set 306a after an initial verification operation has been performed on the optical disc 300, in accordance with one embodiment of the present invention. The sector set 306a includes sectors 306a-0 to 306a-4 which represent user data written to the optical disc 300 as described in operation 110 of the method 100 in FIG. 1. After the sector 306a-1 is verified, the sector 306a-2 is verified (as noted by V) and an error in sector 306a-2 is found. The error was found by reading the user data written to sector 306a-2 and comparing the user data read back from the sector 306a-2 with data written to the system buffer. Thus, during the comparison, it was found that the user data written to the sector 306a-2 did not match the user data stored on the system buffer. Accordingly, the user data originally written to the sector 306a-2 is rewritten to the sector 306a-2', as shown with respect to FIG. 2B. It should be noted that the sector 306a-2' is the next available sector after the sector set 306a. As those skilled in the art will appreciate, the operation of rewriting the user data contained in the sector 306a-2 to the sector 306a-2' is commonly referred to as a "sparing" operation. Once the user data contained in the sector 306a-2 is moved to the sector 306a-2', the verification operation proceeds to verify the sectors 306a-3 through 306a-n. After the remaining sectors of the sector set 306a is verified, the sector 306a-2' is verified. When the user data written in sector 306a-2 is re-written to the sector 306a-2', the file system is updated to reflect the new location of the user data on the sector 306a-2'.

Figure 2C:
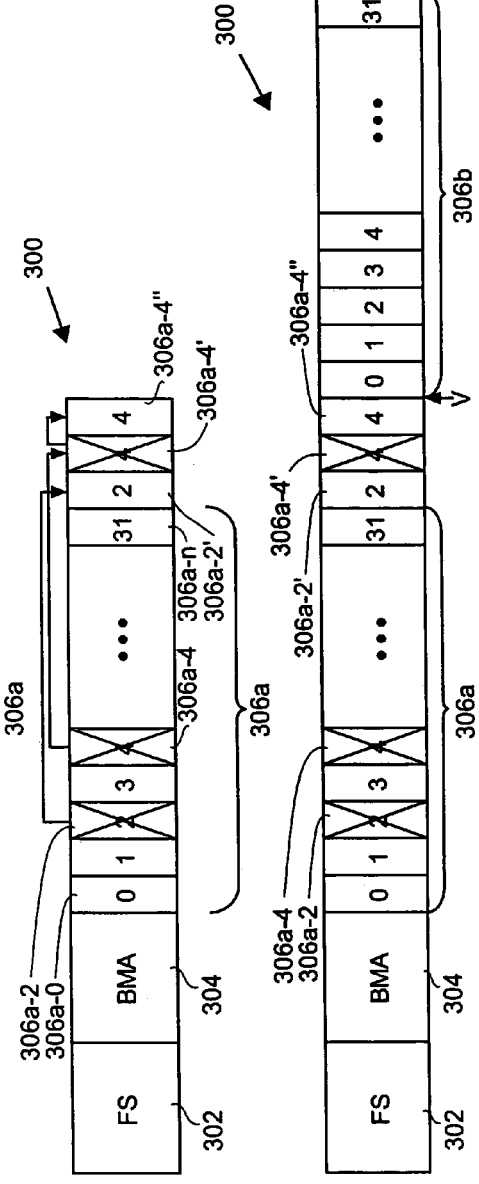
FIG. 2C is another embodiment of the present invention showing a sparing operation on the optical disc.

FIG. 2C is another embodiment of the present invention showing a sparing operation on the optical disc 300. After the user data was written to the sector 306a-2' as described with respect to FIG. 2B, the sectors 306a-3 through 306a-n are verified. In this embodiment, the sector 306a-4 is found to contain an error, thus a sparing operation is performed which moves the data contained in the sector 306a-4 to the sector 306a-4', which is the next available sector after the sector 306a-2'. As the data is re-written to the sector 306a-4', the file system is updated to reflect the new location of the data contained on the sector 306a-4'. The sector 306a-4' is verified after the sector 306a-2' is verified. During the verification operation, the sector 306a-4' was found to contain an error. As such, the data written in the sector 306a-4' is rewritten to the sector 306a-4". Again, the file system is updated to reflect the new location of the data contained on the sector 306a-4". The sector 306a-4" is verified after the data is rewritten to the sector 306a-4" since the sector 306a-4" is the next sector to be verified.

Figure 2D:
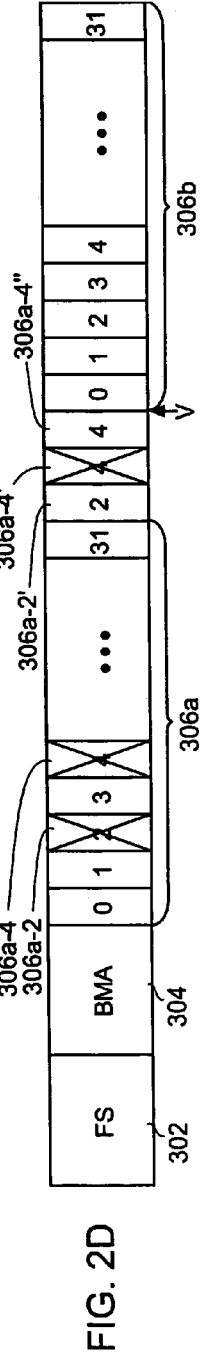
FIG. 2D shows an optical disc with an additional sector set written to the optical disc, in accordance with one embodiment of the present invention.

FIG. 2D shows the optical disc 300 with an additional sector set 306b written to the optical disc 300. After the sector set 306a is verified, the sector set 306b is written to the optical disc 300. The sector set 306b is written at the next available sector after the sector 306a-4" on the optical disc 300.

Figures 2E, 2F:
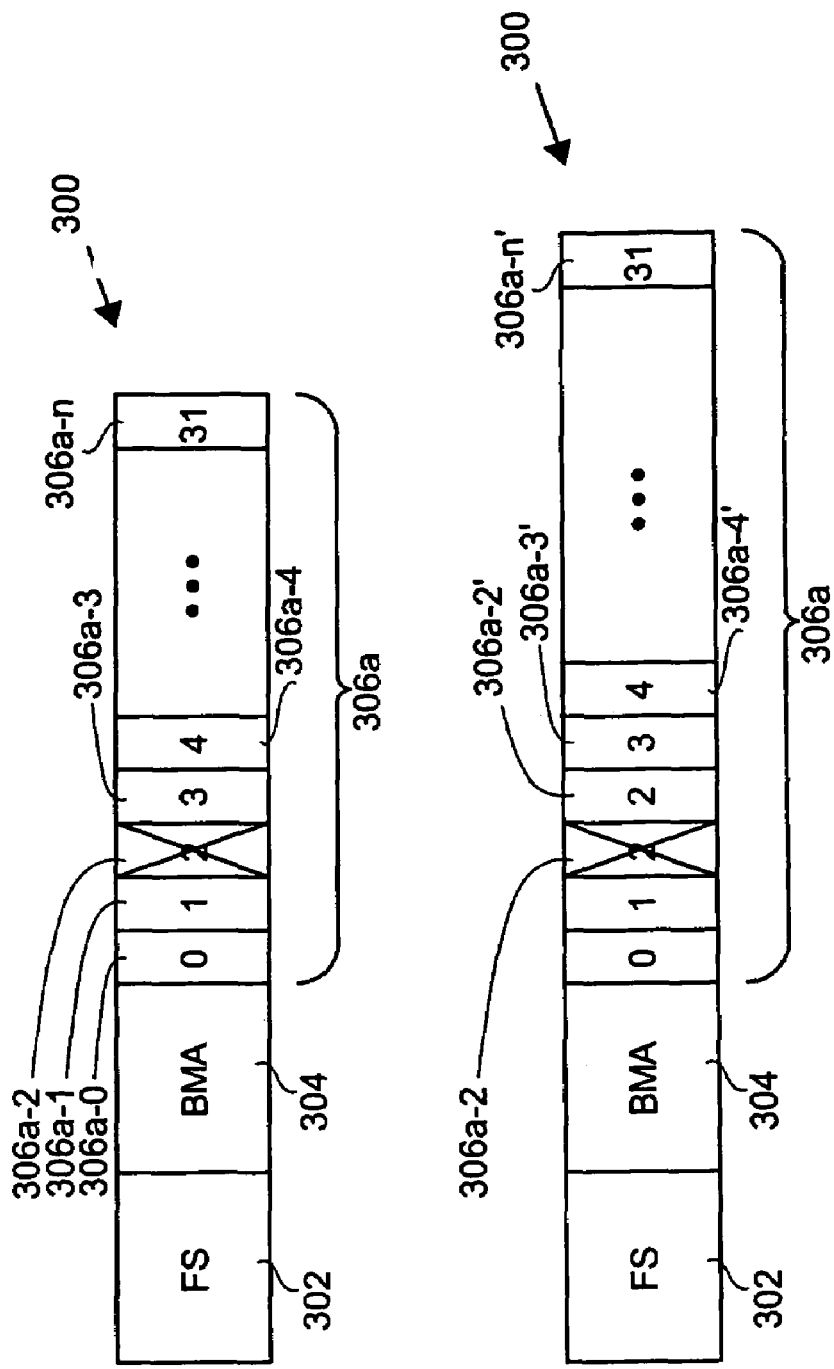
FIG. 2E is an alternative embodiment of a sparing operation on an optical disc.
FIG. 2F shows an optical disc after sectors of a sector set have been shifted one sector.

FIG. 2E is an alternative embodiment of a sparing operation on the optical disc 300. During a verification operation, the sector 306a-2 is found to contain an error. In this embodiment, the sectors following the sector 306a-2 are shifted over one sector to allow the data written on the sector 306a-2 to be moved to a sector adjacent the sector 306a-2 during a sparing operation. Thus, the sector 306a-2 moves to 306a-2', which previously was 306a-3, and sector 306a-3 moves to sector 306a-3', which previously was 306a-4, as shown with reference to FIG. 2F.

FIG. 2F shows the optical disc 300 after the sectors 306a-2 through 306a-n of the sector set 306a have been shifted over one sector. During the sparing operation to rewrite the data written on the sector 306a-2 to the sector 306a-2', the sectors 306a-3 through 306a-n were moved to sectors 306a-3' through 306a-n'. Once the data is rewritten to the sector 306a-2', the sector 306a-2' is verified to detect any errors on the sector 306a-2'.

FIG. 3A shows a bitmap 400 in accordance with one embodiment of the present invention. The bitmap 400 tracks what sectors of the optical disc 300 have been verified. As sectors of the optical disc 300 are updated, the bits 400a through 400n of the bitmap 400 are updated to reflect that the sectors of the optical disc have been verified. Each of the bits 400a through 400n are one bit and are in an initial state. In one embodiment, the bits 400a through 400n are initially written with 0's in the initial state, as shown with reference to FIG. 3A. In one embodiment, each bits 400a through 400e corresponds to a sector on the optical disc 300. In this embodiment, as a sector in the optical disc 300 is verified, the bitmap is updated to an alternate state, such as a 1, to reflect that the sector has been verified. In an alternative embodiment, each bit 400a through 400e corresponds to a sector set, or 32 sectors to be verified on the optical disc 300. In this embodiment, as sector set is verified, a bit on the bitmap is updated to reflect that the sector set has been verified.

FIG. 3B shows the bitmap 400 after sectors of the optical disc 300 have been verified. Once sectors of the optical disc 300 have been verified, the bits 400a through 400n are changed from the initial state to the alternate state, such as from a 0 to a 1. In this embodiment, the sectors represented by the bits 400a through 400c have been verified. Thus, the values in the bits 400a through 400c are changed from 0's to 1's. It should be noted that the bit value of the bits 400a through 400n are changed after the verification operation of the corresponding sector or sectors to that bit is complete, irrespective of whether or not an error was found in that particular sector or that particular set of sectors.

FIG. 4A illustrates a verified optical disc 300 in accordance with one embodiment of the present invention. The optical disc 300 is represented by sector sets 310 through 314. In this example, the sector sets can be any number of sectors. For instance, sector sets 310 and 314 can include one or more sets of 32 sectors. Sector set 312 can include any number of sectors. The sector set 310 is verified with user data according to the method 100 as described with reference to FIGS. 1A and 1B. In this embodiment, the sector set 312 is verified by writing 0's to the sectors and then verifying that the 0's were written by reading the sectors back. As shown in FIG. 4A, this is generally referred to as 0 bit data verification. As mentioned above, 0 bit data verification is also used to verify the file system area 302 and the bitmap area 304. The optical disc 300 is verified using this process until it is determined that additional user data is available to be written to the optical disc 300. Once it is determined that additional user data is to be written to the optical disc 300, the method 100 as discussed with respect to FIGS. 1A and 1B is used to verify sectors of the optical disc 300 in sector set 314.

FIG. 4B illustrates a verified optical disc 300 in accordance with one embodiment of the present invention. The optical disc 300 includes sector sets 316 and 318. The sector set 316 was verified using the method 100 described with respect to FIGS. 1A and 1B. The sector set 318 is verified using the method used to verify the sector set 312 as described with reference to FIG. 4A. In this example, it is assumed that there is no more user data available to verify the optical disc 300, and therefore, the method used to verify the file system area 302 is used to verify the remaining sectors of the optical disc 300.

Figure 5A:
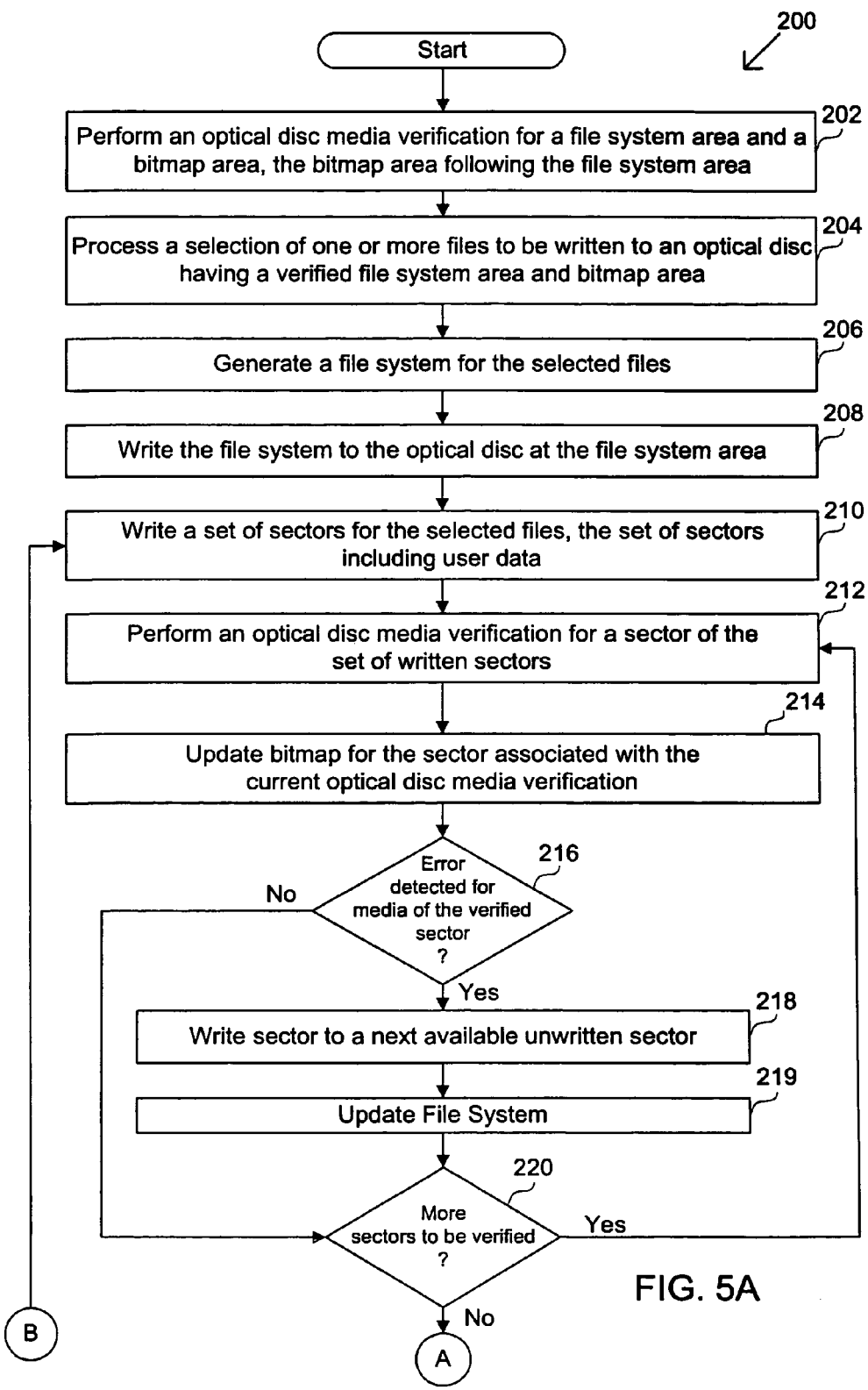
FIG. 5A illustrates a method for verifying sectors of an optical disc in accordance with one embodiment of the present invention.

FIG. 5A illustrates a method 200 for verifying sectors of the optical disc 300 in accordance with one embodiment of the present invention. In operation 202, an optical disc media verification for a file system and a bitmap area is performed. The bitmap area is verified after the file system area is verified. For example, referring to FIG. 2A, the file system area 302 and the bitmap area 304 are verified as previously described with respect to operation 102 in FIG. 1A.

Referring back to FIG. 5A, after the file system area 302 and the bitmap area 304 are verified, the method moves to operation 204. In operation 204, the method 200 processes user data files that are to be written to the optical disc 300. The method 200 then generates a file system for the selected user data files that are to be written on the optical disc in operation 206.

After the method 200 generates the file system for the user data files in operation 206, the method 200 writes the file system to the optical disc at the file system area in operation 208. Referring back to the example, the method 200 writes the file system to the file system area 302 of the optical disc 300 in FIG. 2A. Once the file system is written to the file system area 302, the method writes the user data to the optical disc 300 in operation 210. In the example, the sector set 306*a* shown in FIG. 2A is written to the optical disc 300 in operation 210 of the method 200. The sector set 306*a* includes 32 sectors, 306*a*-0 through 306*a-n*. Also, in this example, an additional 3 sector sets (not shown) are written to the optical disc 300 as the sector set 306*a* is written to the optical disc 300 in operation 210. Since actual user data is written to the optical disc 300 during verification, the overall time to write user data to the optical disc 300 which is being used for the first time is greatly reduced since user data is written directly onto the optical disc for verification instead of 0's.

Turning back to FIG. 5A, after the set of sectors are written to the optical disc 300 in operation 210, the method 200 performs an optical disc media verification in operation 212. The sectors are verified by reading the data contained in each sector on the optical disc 300 and comparing the data read to what is stored on the system buffer of the host. Typically, an error on a sector such as the sector 306*a*-2 is due to a defect on the surface of the optical disc 300 which may have a number of causes, such as drive to media compatibility, a manufacturing defect or mishandling of the optical disc 300 prior to insertion into a drive of the host. After a sector is verified, the method 200 moves to operation 214.

In FIG. 5A, a bitmap for the optical disc 300 is updated in operation 214 of the method 200 after a sector of the optical disc 300 is verified in operation 212. As shown in FIG. 3B, the bitmap 400 is updated regardless of whether or not errors were found in the particular sector represented by the bit. In one embodiment, each bit in the bitmap 400 will track a single sector, and in another embodiment, each bit in the bitmap 400 will track a sector set of 32 sectors. For instance, when 16 sector sets of 32 sectors are written, a bitmap can include 16 bits to track all 512 sectors.

After the bitmap is updated in operation 214, the method 200 moves to operation 216 in FIG. 5A, where a determination is made if an error was detected for the verified sector. If an error is detected in operation, the method 200 writes the user data in the defective sector to a next available sector in operation 218. In the case where 16 sector sets of 32 sectors are written, the next available sector may be the sector after the 16$^{th}$ sector set of 32 sectors. Turning back to the example and FIG. 2B, the method 200 detects an error in a sector in operation 216. Thus, the method 200 moves to operation 218 in FIG. 5A and writes the sector to the next available sector. The file system is then updated to reflect the new location of the data on the optical disc 300 in operation 219 of the method 200.

In FIG. 5A, once the file system is updated in operation 219, the method 200 determines in operation 220 if more sectors are to be verified. In operation 216, the method 200 determines that there is no error, and the method 200 goes to operation 220 and repeats operations 212 through 216, operations 218 and 219 if necessary, and operation 220 for additional sectors.

Figure 5B:
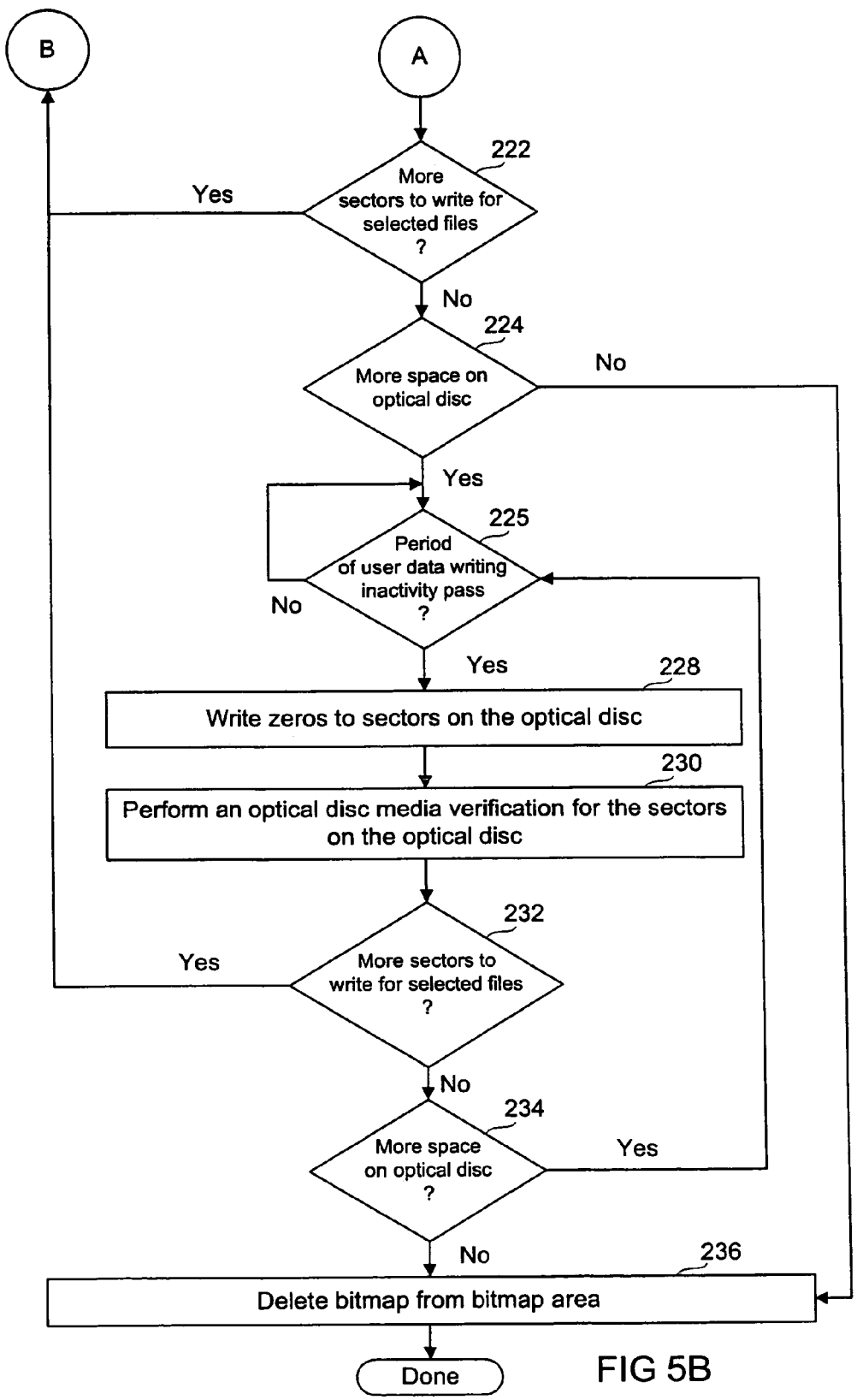
FIG. 5B is an embodiment of the present invention showing a method for verifying sectors of an optical disc.

Now making reference to FIG. 5B, when the method 200 determines that no further sectors are to be verified in operation 220, the method 200 moves to operation 222. In operation 222, a determination is made if more data is to be written to the optical disc 300. If more data is to be written to the optical disc 300, the method 200 repeats the operations 210 through 222 for the additional data to be written to the optical disc 300.

Referring to the example and FIG. 2D, a determination is made in operation 222 that more data is to be written to the optical disc 300. As such, the additional sector set 306*b* which contains additional user data is written to the optical disc 300 in operation 210 and the method repeats operations 210 through 222 for the sector set 306*b* and any remaining user data to be written to the optical disc 300.

If no additional user data is present on the system buffer to be written to the optical disc 300, the method 200 moves to operation 224. In operation 224, the method 300 determines if additional space exists on the optical disc 300. If no additional space exists on the optical disc 300, the optical disc 300 is verified and the method 200 is complete. If it is determined that additional space exists on the optical disc 300, the method 200 moves to operation 225. In operation 225, if a period passes where no additional user data is written to the system buffer of the host, the method 200 proceeds to operation 228.

In operation 228, the method 200 writes 0's to the optical disc 300 in place of user data. In one embodiment, zeros are written to 512 non-verified sectors of the optical disc before the method 200 performs operation 230. After 0's are written to non-verified sectors of the optical disc 300, the non-verified sectors are verified in operation 230. Making reference to the example and FIG. 4A, the sector set 310 was verified with user data in operations 210 through 220 and the sector set 312 was verified using 0's written in operations 228 and 230. After the verification process is complete, the method 200 moves to operation 232, as shown with reference to FIG. 5B.

In the operation 232, the method 200 determines if there are more sectors to write for selected files. As previously mentioned, the selected files contain user data which are to be written to the optical disc 300. If there are more files to be written to the optical disc 300, the method 200 reverts back to the operation 210 and repeats the operations 210 through 224 until the optical disc 300 is verified with the user data. If there are no additional files, the method 200 moves to operation 234 where the method 200 determines if there is additional space on the optical disc 300. If there is more space on the optical disc 300, the method goes back to operation 226 and repeats the operations 226 through 234 until there is no additional space on the optical disc 300. If the optical disc 300 contains no additional space, the method 200 deletes the bitmap 400 in FIG. 3A from the bitmap area in operation 236, which completes the verification process of the optical disc 300 and the method 200.

Turning to the example and FIG. 4A, after the sector set 312 is written to the optical disc 300 in operation 228, the sector set 312 is verified in operation 230. The method 200 then proceeds to operation 232 where it is determined that more selected files are available on the system buffer to be written to the optical disc 300. Thus, operations 210 through 222 are repeated to write and verify the sector set 314. After the sector set 314 is verified, the method 200 determines in operation 224 that no additional space exists on the optical disc 300. As such, the optical disc is verified and the method 200 is complete.

The present invention now makes optical storage media a much more attractive option to end users. The present invention allows user data to be written to sectors of optical media that have not been verified. This method decreases the time it takes to write data to an optical disc when the optical disc is used for the first time. As stated in the background, in the past, 0's were initially written to every sector to verify the optical disc prior to writing data to the optical disc. The present invention avoids this time consuming procedure, thereby greatly decreasing the overall time it takes to verify an optical disc and write data to the optical disc. Thus, software is less likely to skip this procedure before writing data to an optical disc.

In addition, the present invention uses a bitmap to track which sectors of an optical disc have been verified. Also, the presence or absence of a bitmap on the optical disc indicates the verification status of the optical disc. If an optical disc is removed from a disc drive prior to completion of the verification procedure, the bitmap keeps track of the last sector to be verified. As such, when the optical disc is used again, time will not be wasted in determining what was the last sector of the optical disc to be verified. When the optical disc completes the disc verification, the bitmap is deleted from the optical disc. Thus, the presence or absence of a bitmap on the optical disc indicates the verification status of the optical disc and avoids unnecessary steps to determine if an optical disc has been verified when the optical disc is reinserted into a drive at a later time. Additionally, when the bitmap is deleted from the optical disc, the sectors occupied by the bitmap may be used for additional storage.

The present invention also spares data written to defective sectors. The sparing operation moves data written to a defective sector to another sector which is not defective. Consequently, information written to defective sectors is not lost since it is moved to another sector and the file system does not have to keep track of which sectors are defective since data is not stored on the defective sectors.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for verifying sectors on an optical disc, comprising:
    writing user data to unverified sectors of the optical disc;
    verifying the unverified sectors of the optical disc by reading the user data on the unverified sectors of the optical disc;
    comparing the user data read from the unverified sectors of the optical disc with user data written to the unverified sectors of the optical disc to determine whether any one of the unverified sectors having the user data is defective; and
    providing a status indicating whether verification of the optical disc is complete, which includes writing a bitmap to a bitmap area on the optical disc, the bitmap being configured to track which sectors of the optical disc have been verified, and deleting the bitmap from the optical disc after the verification of the optical disc is complete.

2. The method for verifying sectors on the optical disc as recited in claim 1, wherein providing the status indicating whether the verification of the optical disc is complete further includes:
    verifying the bitmap area on the optical disc.

3. The method for verifying sectors on the optical disc as recited in claim 1, wherein each bit of the bitmap tracks a corresponding one of the sectors of the optical disc.

4. The method for verifying sectors on the optical disc as recited in claim 1, wherein each bit of the bitmap tracks a corresponding sector set, the sector set including a plurality of the sectors of the optical disc.

5. The method for verifying sectors on the optical disc as recited in claim 1, further comprising:
    writing a file system to a file system area on the optical disc, the file system including information corresponding to locations of the user data on the optical disc.

6. The method for verifying sectors on the optical disc as recited in claim 5, further comprising:
    rewriting the user data written on a defective sector to a next available sector of the optical disc.

7. The method for verifying sectors on the optical disc as recited in claim 6, further comprising:
    updating the file system to reflect a location of the user data at the next available sector of the optical disc.

8. The method for verifying sectors on the optical disc as recited in claim 5, further comprising:
    verifying the file system area on the optical disc.

9. The method for verifying sectors on the optical disc as recited in claim 1, further comprising:
    determining if further user data is to be written to the unverified sectors of the optical disc;
    writing data to the unverified sectors of the optical disc if it is determined that further user data is not to be written to the unverified sectors of the optical disc, wherein the data are 0's; and
    verifying the unverified sectors of the optical disc by reading the data written to the unverified sectors of the optical disc and determining if the data read from the unverified sectors are 0's.

10. The method for verifying sectors on the optical disc as recited in claim 1, wherein writing the user data to the unverified sectors of the optical disc includes writing the user data from a system buffer to the unverified sectors of the optical disc.

11. A method for verifying sectors on an optical disc, comprising:
    writing user data to a sector of the optical disc, wherein a location of the user data on the sector is included in a file system associated with the optical disc;
    verifying the sector of the optical disc by reading the user data from the sector of the optical disc and comparing the user data read from the sector of the optical disc with the user data written to the sector of the optical disc to determine whether the sector of the optical disc is defective;

if the sector of the optical disc is defective, rewriting the user data to a next available sector of the optical disc and updating the file system associated with the optical disc to include a location of the user data on the next available sector of the optical disc; and providing a status indicating whether verification of the optical disc is complete, which includes writing a bitmap to a bitmap area on the optical disc, the bitmap being configured to track which sectors of the optical disc have been verified, and deleting the bitmap from the optical disc after the verification of the optical disc is complete.

12. The method for verifying sectors on the optical disc as recited in claim 11, wherein providing the status indicating whether the verification of the optical disc is complete further includes:

verifying the bitmap area on the optical disc.

13. The method for verifying sectors on the optical disc as recited in claim 11, wherein each bit of the bitmap tracks a corresponding one of the sectors of the optical disc.

14. The method for verifying sectors on the optical disc as recited in claim 13, wherein each bit of the bitmap is identified by a first value if the corresponding one of the sectors of the optical disc is verified, and wherein each bit of the bitmap is identified by a second value if the corresponding one of the sectors of the optical disc is unverified.

15. The method for verifying sectors on the optical disc as recited in claim 11, wherein each bit of the bitmap tracks one corresponding sector set, the one corresponding sector set including a plurality of the sectors of the optical disc.

16. The method for verifying sectors on the optical disc as recited in claim 11, wherein the file system is rewritable.

17. The method for verifying sectors on the optical disc as recited in claim 11, wherein the file system is updated as the user data is written to the optical disc.

18. The method for verifying sectors on the optical disc as recited in claim 11, wherein the user data is stored on a system buffer.

* * * * *